Patented Nov. 4, 1952

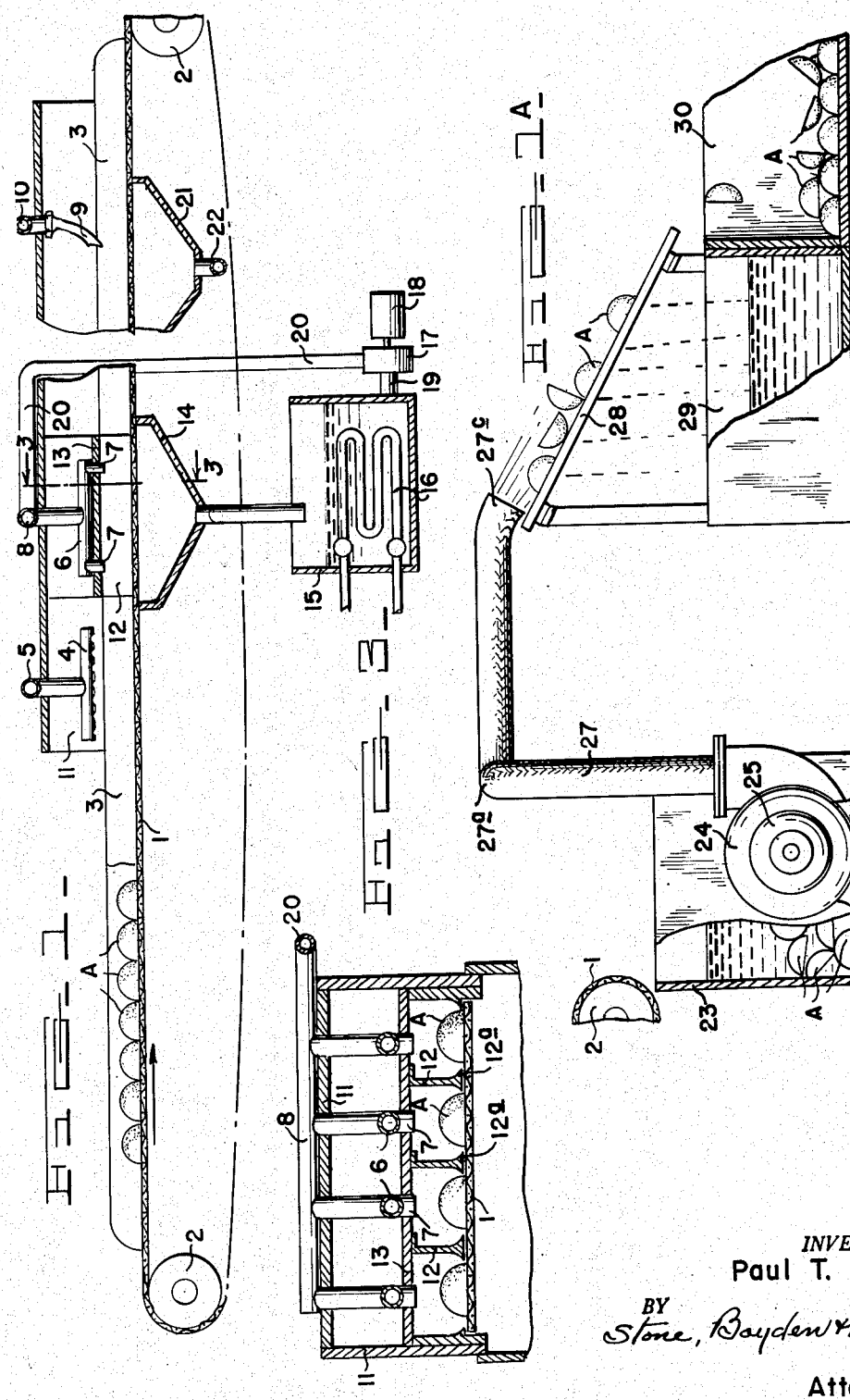

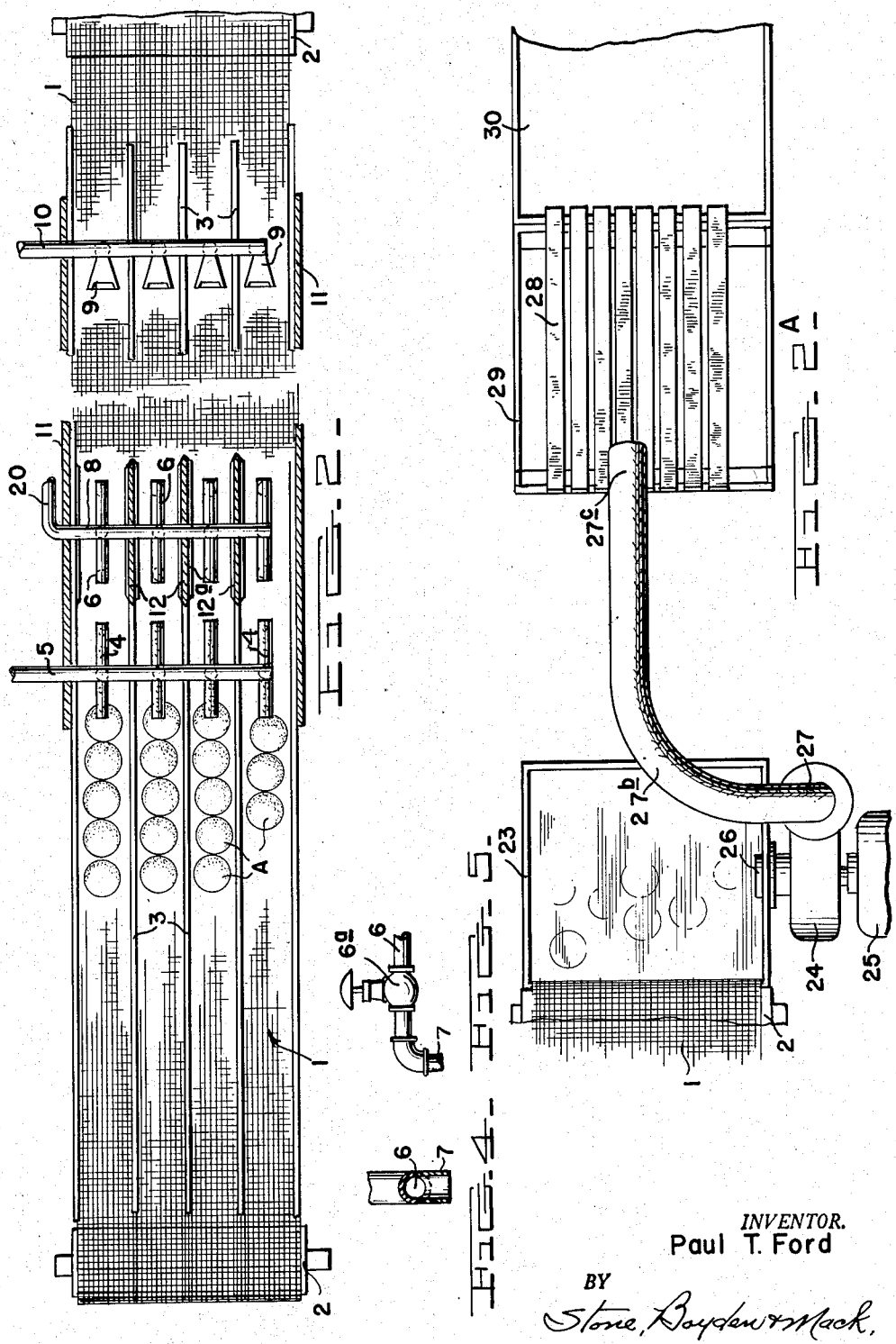

2,616,819

UNITED STATES PATENT OFFICE 2,616,819

APPARATUS FOR AND METHOD OF PEELING PEACHES

Paul T. Ford, Dillon, S. C., assignor to Stansbury, Inc., Baltimore, Md., a corporation of Maryland Application May 26, 1947, Serial No. 750,477

8 Claims. (Cl. 146—225)

This invention relates to the treatment of fruits and vegetables and more particularly to the peeling of such fruits as peaches and apricots.

It has been common practice for many years to remove the skins from peaches by subjecting them to the action of a hot caustic solution which tends to loosen or disintegrate the skins. It has also been known that the application of steam to the peaches prior to treatment with the caustic solution increases the effectiveness of this solution for loosening the skins.

Many methods of treating the fruit with the caustic solution have been tried, including immersion, spraying under high pressure so as to produce a mist or fog of caustic, and pouring a stream of caustic solution upon the peaches as they are caused to travel along.

This latter method has heretofore involved the use of an open trough extending transversely of the path of movement of the peaches, the caustic solution being delivered into this trough and overflowing the edge thereof in the form of a sheet, cascading down upon the peaches. In practice the peaches to be treated have been first pitted and halved, and the halves laid, skin side up upon a traveling woven wire or other foraminous belt. The peach halves, supported on this belt, are carried under the above mentioned cascade of caustic solution.

Two main objections have been found to this method of applying the caustic. In the first place, the stream pouring over the edge of the trough is far from uniform, so that the peaches on one part of the belt receive a much larger quantity of caustic than those on another part, so that the results obtained have been by no means uniform. In the second place, the fact that the solution stands in the trough for an appreciable time before it pours over the edge onto the peaches, results in the solution losing a large part of its heat, and this greatly decreases the efficiency thereof.

Another problem connected with this general method of peach peeling is the problem of removing the skins from the peach halves, after they have been loosened by the caustic. One method which is commonly employed is to remove the loosened skins by means of jets of water discharged under high pressure. These jets are more or less effective in removing the skins, but at the same time, when the peaches are soft, such jets scar or pock mark the flesh of the peaches, resulting in a product which is commercially undesirable.

One of the objects of the present invention is to devise improved means for applying the hot caustic solution to the peach halves carried by the belt, so that all of the fruit is treated effectively and uniformly. To this end the invention contemplates causing the peaches to travel on the belt in separate runways or lanes, the width of each lane being substantially equal to the maximum diameter of the peaches being treated, so that the peach halves move along each lane in single file, one behind the other. I then provide separate means for pouring a gentle, uniform stream of hot caustic upon the peach halves in each lane.

As distinguished from the prior method, above referred to, in which the solution stands in troughs and thus loses its heat, the present invention provides means for delivering the hot caustic from a pump directly upon the peaches, without any appreciable delay, thus assuring that the solution reaches the fruit in highly heated condition.

Another object of the invention is to devise improved means for washing the peach halves and for removing the loosened skins therefrom without in any way scarring or marring the fruit. My improved means comprises pumping a fluid mixture of the treated peach halves and water through a conduit, thus subjecting the peach halves to a tumbling and abrading action and effectively removing the skins therefrom.

In order that the invention may be readily understood reference is had, by way of illustration, to the accompanying drawings forming part of this specification, and in which Figs. 1 and 1A taken together constitute a diagrammatic side elevation of my improved apparatus;

Figs. 2 and 2A taken together constitute a plan view of this apparatus;

Fig. 3 is a transverse section on an enlarged scale taken substantially on the line 3—3 of Fig. 1 looking in the direction of the arrows;

Fig. 4 is a sectional detail showing one of the delivery nozzles for the caustic solution; and Fig. 5 is a fragmentary side elevation of one of the delivery nozzles showing a valve to restrict the flow therethrough.

Referring to the drawings in detail, my improved apparatus comprises as usual, a woven wire or other foraminous endless belt 1 passing over rollers 2 placed a relatively great distance apart, such as 50 to 75 feet.

The belt is continuously driven at a suitable speed and the peaches, having been first pitted and halved are laid by hand, skin side up, upon the upper run of this belt adjacent one end thereof, namely the left hand end as shown at A in Fig. 1.

While it has heretofore been the practice to lay these peach halves indiscriminately and at random on the belt, over the full width thereof, I have by the present invention devised means whereby the peach halves may be separated on the belt into single file rows, and are carried along while arranged in this way. I accomplish this by means of guides or partitions 3 supported just above the upper surface of the belt and extending longitudinally thereof for substantially its full length. In the drawings, I have shown five such guides or partitions, dividing the width of the belt into four alleys or lanes, the partitions being spaced apart a distance approximately equal to the maximum diameter of the peaches being treated. Thus, as shown in Fig. 2 the peaches travel along in a plurality of parallel rows, being arranged in each row in single file, one behind the other.

I provide, as is customary, means for subjecting the traveling peach halves first to the action of jets of steam. My improved apparatus for doing this comprises a plurality of spray nozzles 4 disposed above the belt and each consisting of an elongated pipe section extending longitudinally of the belt, one of these pipe sections being provided for each lane. Thus as the peaches move along they are exposed to the action of the steam for a substantial period of time. Steam is supplied to the several nozzles 4 by means of a transversely extending pipe 5, connected to a suitable source.

Beyond the steam nozzles, I provide means for discharging hot caustic solution upon the peach halves, as they progress. This improved means comprises a pipe section 6 extending longitudinally above each lane and having a pair of downwardly directed nozzles 7 projecting therefrom, one near each end.

The caustic solution is supplied to these pipes and nozzles by means of a transverse pipe 8 as shown in Figs. 1 and 3.

Finally, beyond the point at which the peaches are treated with the caustic solution, and in fact spaced longitudinally of the belt a considerable distance, such as 10 to 15 feet, from the caustic nozzles, I provide nozzles 9, one for each lane, for spraying water upon the treated peaches, these nozzles being connected with a supply pipe 10. The purpose of the water is simply to wash the excess caustic from the fruit. To this end the nozzles 9 which I prefer to employ are of special construction, designed to discharge a fan-shaped very fine spray, as distinguished from concentrated high velocity jets. As above pointed out such jets are undesirable, since they tend to scar and mar the fruit.

Over the entire fluid supplying apparatus, including the elements 4 to 10 inclusive, above described, I provide a hood or tunnel 11. Inside of this I provide an additional box structure adjacent the caustic solution nozzles, this box structure, as best shown in Fig. 3, comprising special partitions 12 and a top or cover 13 through which the nozzles 7 extend. By reference to Fig. 3 it will be seen that each of the special partitions 12 is provided adjacent its lower portion with an outwardly beveled or flaring edge 12a, so arranged that the peach halves in each alley or lane pass between two such flared edges.

I regard this as an important feature of the invention. The peach halves are placed in each row preferably in substantial contact with each other as shown in Fig. 2, and as the caustic solution pours from the nozzles 7 and flows down over the convex surface of the peach halves, it is more or less confined and deflected back and forth between adjacent halves. The purpose of the flaring edges 12a is to produce at the sides of the peach halves substantially the same action as is produced by the halves themselves at the front and rear edges thereof. This is to say the liquid flowing down the sides of the peach halves is deflected by the flaring edges 12a and caused to thoroughly contact the lower portion of each half. In this way the action of the caustic solution on all four sides of each peach half is substantially uniform.

A catch basin or hopper 14 is disposed beneath the caustic nozzles 7, and the caustic solution flowing down through the belt is delivered through a pipe from this catch basin into a tank 15 containing a steam heating coil 16. A centrifugal pump 17 driven by a motor 18 is arranged to draw the hot caustic solution from the tank 15 through a connection 19 and deliver it through pipe 20 to the discharge pipe 8. From this pipe 8 the solution divides, part passing to each of the pipes 6, where it is again divided between the two nozzles 7.

By reference to Fig. 4, it will be seen that the delivery nozzles 7 are in the nature of open unrestricted nipples of substantially the same size as the pipe 6. Thus, although the caustic solution is of course delivered under pressure by the pump 17 through the pipe or conduit 20, by the time it has been divided as above described and has reached the individual nozzles 7, the pressure is practically lost and the flow reduced so that it issues from each nozzle in the form of a gentle solid stream, under substantially no pressure.

In Fig. 5, I have shown another or additional means by which the delivery of caustic solution from the nozzles 7 may be caused to assume the form of a gentle stream. In this arrangement, I have provided an adjustable valve 6a which is shown in Fig. 5 as being interposed in the pipe 6 adjacent each of the two nozzles. Obviously, regardless of the pressure of the solution when it reaches the pipe 6, the flow through the nozzle 7 may be adjusted by means of this valve so that the solution issues from each nozzle in the form of a gentle solid stream, the size of which may be regulated as desired.

While I have shown the valves 6a in Fig. 5 as interposed in the pipes 6, it will of course be understood that I also contemplate inserting such a valve in pipes 8 or 20 if desired, to throttle down or restrict the flow to the desired extent.

It will thus be seen that my improved apparatus comprises unrestricted nozzles 7 connected by conduit means with a pump, and valve means in the conduit means for regulating the flow of solution so as to assure its delivery from the nozzles in the form of a quiescent gentle stream.

It will further be seen that the caustic solution in the tank 15, maintained in a highly heated condition by the steam coils 16, is delivered directly by the pump 17 to the nozzles 7, without any substantial delay, and thus does not lose any appreciable amount of its heat. As is well known, the hotter the solution when it contacts the fruit, the greater its efficiency.

The treated and washed peach halves are discharged from the right hand end of the belt 1 into a tank or receptacle 23, containing water. A centrifugal pump 24 driven by a motor 25 is arranged to draw in through a connection 26 the mixture of peaches and water and force it out through a conduit 27. This conduit is shown as having a portion extending upwardly from the pump. Whether or not it has an upwardly extending portion, the conduit must be so arranged that it will be completely filled with an unbroken stream of the liquid mixture, free from any voids or air pockets. As shown in Fig. 1A, the intake 26 of the pump, is preferably located well below the level of the liquid in the tank 23, so that the mixture of peaches and water tends to flow by gravity into the intake. The conduit 27 is preferably in the nature of a flexible hose and is provided with at least one and preferably two bends 27a and 27b, each of a substantial angle, such as approximately 90°. The end of the hose 27c is arranged to deliver upon an inclined slatted screen 28 disposed over a tank 29, adjacent which is arranged a receptacle 30 for the peach halves.

In practice I have found that a piece of four inch rubber hose is suitable for use as the conduit 27 and by employing a specially designed non-clog pump it is found that the peach halves will pass into and through the pump and hose without appreciable injury. It will be noted that the size of the conduit is preferably of the same order of magnitude as the maximum diameter of the peaches being treated, so that there is only a small clearance between the peach halves and the walls of the conduit.

As the peach halves, mixed with water, travel through the hose, and especially as they pass around the bends 27a and 27b, they are subjected to a tumbling action and rub against the inner walls of the hose, with the result that the previously loosened skins are completely disintegrated and removed from the peaches.

As the mixture is delivered onto the screen 28 as shown in Fig. 1A, the peach halves slide down this screen into the receptacle 30, while the water and disintegrated skins pass down between the slats into the tank 29.

Thus I have provided novel and improved means for completely removing the skins from peaches previously treated with caustic, and I accomplish this without in any way marring or scarring the fruit, and at the same time subject the fruit to a thorough washing operation.

While in the specification and claims I have used the word "peaches" it will of course be understood that I mean to include apricots or any other fruit to which the invention is applicable.

What I claim is:

1. Apparatus for peeling peaches comprising a conveyor belt, means for causing peach halves to be carried along on said belt in a plurality of separate rows, separate means for gently pouring a stream of hot caustic solution on each row of peach halves, as they progress, and vertically extending stationary baffles disposed one between each row of peach halves, adjacent the point of delivery of the solution, the lower edges of said baffles being flared laterally, said flared portions serving to confine the solution as it runs off of the peach halves and deflect it back against the sides of such halves.

2. Apparatus for peeling peaches comprising means for subjecting them successively to the action of a caustic solution to loosen the skins and to a spray of wash water to remove excess caustic, and centrifugal means for propelling the peaches, thus treated, and mixed with water, through an unobstructed stationary conduit having a bend of a substantial angle, whereby they are caused to rub against the walls of such conduit, and the loosened skins thus removed.

3. Apparatus for removing loose skins from peaches comprising a relatively long, unobstructed conduit having at least one substantial bend and having a diameter of the order of magnitude of the maximum diameter of the peaches being treated, means for forming a fluid mixture of water and the peaches being treated, and centrifugal means for propelling such mixture in a continuous stream through said conduit, whereby the peaches are caused to rub against the walls of said conduit as they travel along, and the skins thus removed.

4. The method of peeling peaches which comprises forming a fluid mixture of water and peach halves having skins in readily removable condition, and centrifugally impelling such mixture through a relatively long confined path having at least one upwardly extending portion, and bringing the peach halves into frictional engagement with the confines of such path by changing its direction.

5. The method of peeling peaches which comprises forming a fluid mixture of water and peach halves having skins in readily removable condition, and centrifugally forcing such mixture to flow in an unbroken stream along a confined path, and bringing the peach halves into frictional engagement with the confines of such path by changing the direction of flow.

6. Apparatus for peeling peaches comprising means for subjecting them successively to the action of a caustic solution to loosen the skins and to a spray of wash water to remove excess caustic, a tank of water into which the peaches, thus treated, are received, an unobstructed stationary conduit having at least one bend and a centrifugal pump having its inlet connected with said tank for continuously withdrawing therefrom the mixture of peaches and water, and propelling such mixture through said conduit, whereby the peaches are subjected to a tumbling action, and the loosened skins thus removed.

7. The method of peeling peach halves having skins in readily removable condition which comprises mingling such halves with sufficient water to form a fluid mixture, and centrifugally impelling such mixture at high velocity through a relatively long conduit having an unobstructed interior throughout its length and formed with at least one substantial bend, so as to subject the peach halves to a tumbling action, and to cause them to rub against the walls of the conduit.

8. In a method of removing the skins from peaches, the steps which comprise first pitting and halving the fruit, treating the halves to loosen the skins, then mingling the treated halves with sufficient water to form a fluid mixture, and centrifugally impelling such mixture at high velocity through a relatively long conduit having an unobstructed interior of uniform size throughout its length, said conduit having at least one upwardly extending portion and being formed with at least one substantial bend, whereby the peach halves are subjected to a tumbling action.

PAUL T. FORD.

REFERENCES CITED

The following references are of record in the file of this patent:

UNITED STATES PATENTS

| Number | Name | Date |
|---|---|---|
| 784,527 | Vernon | Mar. 7, 1905 |
| 850,655 | Judge | Apr. 16, 1907 |
| 858,095 | Monte | June 25, 1907 |
| 1,104,175 | Dunkley | July 21, 1914 |
| 1,280,879 | Shannon | Oct. 8, 1918 |
| 1,393,287 | Hunter | Oct. 11, 1921 |
| 1,396,268 | Dunkley | Nov. 8, 1921 |
| 1,427,270 | Dunkley | Aug. 29, 1922 |
| 1,438,467 | Walden | Dec. 12, 1922 |
| 1,468,873 | Bost et al. | Sept. 25, 1923 |
| 1,564,980 | Singer | Dec. 8, 1925 |
| 1,916,269 | Kingsbury | July 4, 1933 |
| 2,065,239 | Mills | Dec. 22, 1936 |
| 2,229,610 | Nicholay | Jan. 21, 1941 |
| 2,261,560 | Pellas et al. | Nov. 4, 1941 |
| 2,477,006 | Pierson | July 26, 1949 |